Patented Jan. 8, 1952

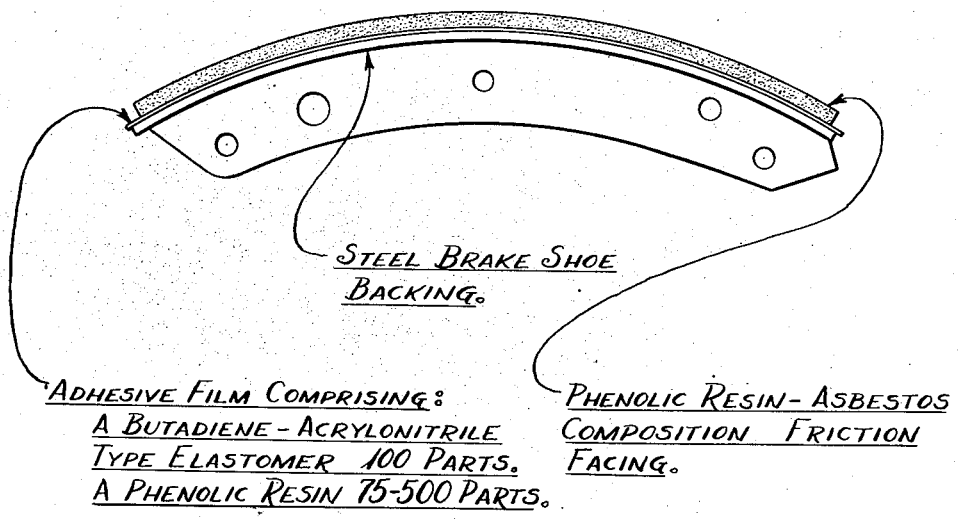

2,581,926

UNITED STATES PATENT OFFICE 2,581,926

FRICTION ELEMENTS

Frank J. Groten, Upper Montclair, N. J., and Robert J. Reid, Canal Fulton, Ohio, assignors to The Firestone Tire & Rubber Company, Akron, Ohio, a corporation of Ohio Application October 18, 1946, Serial No. 704,272

6 Claims. (Cl. 154—81)

This invention relates to adhesives for securing non-metallic friction material to the metallic backings of friction elements such as brake shoes, clutch discs, and the like.

The usual type of friction element such as a brake shoe, clutch disc or the like, comprises a non-metallic friction facing secured to a metallic backing by means of mechanical fastenings such as lugs, bolts, rivets, bosses, combinations of these devices, etc. Even at best, the use of such mechanical fastenings is most undesirable, since they produce local concentrations of strain, diminution of cross section and other features highly disadvantageous in the design of friction materials, which are usually rather weak and brittle. It has therefore been proposed to make use of adhesives for the attachment of friction materials to the metallic backings of friction elements. However, the adhesives and application methods heretofore proposed have not been found entirely satisfactory; in general, the proposed adhesives have been formulated as solvent cements, which are unsatisfactory in large scale production both from the standpoints of uniformity of application and of rapid processing; likewise, most of the composite adhered finished friction elements have been found lacking in strength and durability.

Accordingly, it is an object of this invention to provide novel adhered composite friction elements and a method for making the same.

Another object is to provide adhered composite friction elements which will have desirable high strength and reliability in service.

A further object is to provide a method for the adhesion of friction materials to their metallic backings, which may be carried out expeditiously and with a minimum of skilled labor and supervision under conditions commonly prevailing in manufacturing establishments.

A further object is to provide such a process not involving the inconvenience, delay and hazard attendant upon the use of solvent cements.

A still further object is to provide novel adhesive materials capable of attaining the objects above enumerated.

The above and other objects are secured, in accordance with this invention, by the use of an adhesive prepared in the form of a dry, thin, moderately flexible film composed basically of:

| | Parts by weight |
|---|---|
| A butadiene-acrylonitrile-type elastomer | 100 |
| A phenolic resin | 75–500 |
| Appropriate curing agents for the preceding ingredients | As required |

A non-metallic friction material and its metallic backing are assembled together, with the adhesive film interposed between the surfaces to be joined together, and the assembly is cured together by the application of heat and pressure, the latter being directed so as to hold the surfaces together. In the resultant adhered structure, the friction material is powerfully and reliably bonded to the metallic backing, the bond being quite shock resistant and capable of withstanding the repeated strains to which it will be subjected in use. The single view of the drawing illustrates a friction assembly made according to this invention.

*The butadiene-acrylonitrile-type elastomer*

Describing the invention now in greater detail, and referring first to the butadiene-acrylonitrile-type elastomers forming one principal component of the adhesive films of this invention, these may be any elastomeric copolymers of any butadiene-type compounds having the formula

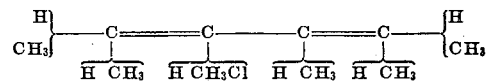

with any acrylonitrile-type compounds having the formula

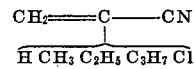

in which formulae each bracket indicates attachment of one of the substituents shown embraced thereby. Based on copolymer weight, the proportion of the acrylonitrile-type compounds may vary from about 10% to about 75%. Suitable copolymers may be prepared by any of the usual polymerization procedures, for instance by emulsion polymerization of a mixture of a suitable butadiene-type compound with a suitable acrylonitrile-type compound in the presence or absence of modifying agents etc., as will appear more particularly hereinafter. Butadiene-type compounds suitable as one component of the elastomers employed in the practice of this invention are exemplified in butadiene; isoprene; 1-methyl-1,3-butadiene; 2,3-dimethyl-1,3-butadiene; and chloroprene. Suitable acrylonitrile-type compounds are exemplified in acrylonitrile; methyl acrylonitrile; ethyl acrylonitrile; propyl acrylonitrile; and chloro acrylonitrile. Specific examples of commercial elastomers of the type employed in this invention are "Hycar OR," "Butaprene NXM" and "Perbunan" (trade names respectively of the Hycar Chemical Company, The Firestone Tire & Rubber Company and the Standard Oil Company).

The manufacturing history of any elastomer will greatly affect its behavior in the compositions of this invention. One principal variation in the usual processes of copolymerizing diolefins with acrylonitriles consists in the use of "modifying" or regulating agents during polymerization, examples of this practice being shown in the patent to Wolthan 2,281,613. These agents appear to inhibit cross-bridging of the elastomer chains, and also seem to result in products of somewhat lower molecular weight. The same general effect can be secured by limiting the extent to which the polymerization is carried out. These are well known techniques in the manufacture of elastomers of this general type, and elastomers produced by limiting the extent of polymerization and/or the use of modifying agents will hereinafter be designated as "modified" in accordance with the usual trade terminology. Compared with unmodified elastomers, modifier elastomers tend to be more plastic in nature; are more readily compatible with the phenolic resins than unmodified elastomers; and do not require such elevated temperatures to effect compounding.

Likewise, elastomers of the type employed in this invention are greatly affected by the mode of drying of the polymers after they have been coagulated and separated from the emulsion in which they were polymerized. Commercially, these elastomers are dried by means of hot air in ovens, which treatment appears to result in a continued polymerization thereof, and in a less ready compatibility thereof with the phenolic resins. Likewise such oven-dried elastomers tend to have less cold-resistance than elastomers which have not been subjected to oven drying. Accordingly, the use of oven drying is to be avoided if possible. One excellent technique to this end involves the omission of the air-drying step altogether, the wet curd being simply milled with the other ingredients. The milling extrudes a large portion of the water, and the remainder is evaporated.

A third important variable in the history of any elastomer to be used in this invention is its age. In general, freshly-prepared elastomers are more readily compatible with the phenolic resins, and yield superior products, particularly in regard to cold resistance, as compared to aged elastomers.

The foregoing manufacturing variables—degree of polymerization, use of modifying agents, mode of drying, and age—have more or less concurrent influence upon the compatibility, ease of compounding, temperature of compounding, and cold-resistance of the final products in the practice of this invention. Modification, omission of oven-drying, and freshness of elastomer, or any combination or degree of these factors, will lower the temperature at which the elastomer may be incorporated with the phenolic resin (as will appear more fully hereinafter, heat must ordinarily be applied to effect blending of these materials) and tend also to make the finished products more cold-resistant. In some cases, particularly when the elastomer is more or less fresh, these devices make possible the direct compounding of the ingredients upon the mill without the use of supplementary heat. The several factors may more or less substitute for one another. For instance, an elastomer of a given age may be just barely compatible with a given phenolic resin without the use of heat. A somewhat older elastomer would similarly be compatible, provided a greater degree of modification was involved in the preparation thereof, or if the oven drying thereof was omitted.

It has recently become known that butadiene-acrylonitrile elastomers, similarly to natural rubber, consist of "sol" and "gel" fractions; and the factors which have been observed to favor the predominance of the "sol" fraction in butadiene-acrylonitrile elastomers, are the same factors which are noted above as resulting in more ready compounding, enhanced cold resistance, etc. in the process and product of this invention. It may therefore be stated that a high "sol" content in a given elastomer is a sufficient (although perhaps not necessary) condition for such ready compounding and enhanced cold resistance.

The phenolic resins

The phenolic resins employed as the other principal constituents of the compounds of this invention may be any of the well-known class of phenolic resins produced by condensing any phenolic compound with any aldehydic compound, generally in the ratio of about ¾ to about 3 mols of aldehydic constituent for each mol of phenolic compound. Exemplary phenols suitable for this purpose are phenol itself; the ortho, para and meta cresols; the xylenols; the dihydroxy benzenes, such as resorcinol; the polynuclear phenols such as the naphthols; and the various alkylated aralkylated, carboxylated, alkylolated, etc. derivatives of phenols of these types, such as o-ethyl phenol, carvacrol, salicylic acid and the like. Suitable aldehydes are exemplified in formaldehyde, acetaldehyde, propionaldehyde, benzaldehyde and the like. The resins may also be of the "modified" types produced by the addition of oils, alkyd resins, etc. during the condensation. The preferred resins are those of the type formed by the combination of an aldehyde with phenol itself, or with one or more of the cresols, or with a mixture of phenol with one or more cresols, as these resins do not inhibit, and in most cases actually favor, the heat-curing of the compounds of this invention.

As is well known, the phenolic resins are usually synthesized in the presence of catalysts, which essentially consist either of hydrogen-ion-yielding (acidic) or of hydroxyl ion yielding (basic) substances. The acid-condensed resins are usually neutralized, upon the conclusion of the condensation reaction, with a basic substance, usually hexamethylene tetramine. The hexamethylene tetramine, besides neutralizing the resin, also serves as a curing agent which must always be supplied at some stage when acid-condensed phenolic resins are to be cured. When hexamethylene tetramine is to be used in connection with the resin in compositions according to this invention, the resin is preferably heat-treated before the resin is compounded with the elastomer. If such heat-treatment is not carried out, or if the addition of the hexamethylene tetramine is delayed until after the addition of the elastomer, it reacts unfavorably upon the elastomer. It is understood, of course, that both general types of phenolic resins develop excellent working properties in the uncured compositions, and outstanding strength, and other mechanical properties in the final cured product.

As is well known, the phenolic resins condense in several stages, forming first a soluble resin, which passes successively to an insoluble but fusible resin and then to a final insoluble and infusible resin. It is to be understood that the condensation of the phenolic resins for use in this invention must not be carried beyond the fusible stage before incorporation with the elastomer, as otherwise such incorporation becomes impossible.

Compounding

Referring to the incorporation of the phenolic resins with the ordinary commercially prepared elastomers, as noted above, these materials cannot be blended together by ordinary methods. However, it has been discovered that these materials may be incorporated together by any suitable milling operation conducted at least in part at temperatures upwards of about 80° C. and below the temperatures at which curing or thermosetting of the selected elastomers and/or phenolic resins will occur during the time the materials are held at this elevated temperature. Thus, for instance, the selected elastomer may be initially broken down on a cold roll mill, and the selected phenolic resin is then introduced into the working bank of the elastomer on the mill to form an even mixture, but no true fused compound, with the elastomer. The temperature is then caused to rise to above 80° C. but below the temperature at which thermosetting of the phenolic resin occurs, whereupon the mass fuses into a homogeneous compound. The resultant compound will be plasticized to a degree suitable for compounding additional ingredients thereinto, and for working up into the adhesive films of this invention. It is to be understood that the milling operation may be carried out upon types of mills other than roll mills, such as Baker-Perkins mixers, Banbury mixers and the like, provided, of course, that heat be supplied at some time during the milling to fuse the ingredients together.

As noted above, the hot-milling process is unnecessary, or can be carried out at lower temperatures, for the production of the compounds of this invention from high "sol"-content elastomers which have been specially prepared by the exercise of a sufficient degree of modification and/or omission of a hot air drying and/or avoidance of aging and/or other special techniques. Such special precautions are of course, never observed in commercial practice and the ordinary commercial elastomers could not be used in this special manner. Thus a modified, freshly-prepared elastomer may be milled with a phenolic resin, without addition of any heat other than that developed by milling, to yield homogeneous true compounds. Likewise, in those cases where it may be desired to form the adhesive films of this invention by a technique involving film-casting of a solution of the constituents, it has been found that ingredients blended in this manner can be dissolved in suitable solvents for such casting procedures. By way of contrast to this behavior, a solution made, without preliminary milling together of the ingredients, from a phenolic resin and an ordinary commercial elastomer, will tend to separate into two phases.

Curing agents

The adhesive films of this invention should further comprise curing agents for at least one, and preferably both, of the butadiene-acrylonitrile type elastomer and the phenolic resin. Suitable curing agents for the elastomer include sulfur, preferably in connection with accelerating agents and activating oxides such as benzothiazyl disulfide, thiuram polysulfides, mercaptothiazoles, guanidines, aldehyde-amines, zinc oxide, litharge and the like. In some cases, the cure of the butadiene-acrylonitrile-type compound may be effected in the absence of sulfur. A highly satisfactory curing agent for phenolic resins is hexamethylene tetramine. The materials may also contain the usual pigments and reinforcing agents, but no special advantages seem to ensue from the use of these latter materials.

Formation of films and use thereof

The dry adhesive films of this invention may be worked up from the constituent materials in various ways, and most conveniently by sheeting out the mill-mixed ingredients on a calender. Alternatively, the constituents may be made up into a solvent solution or cement, and the solution cast and dried upon a suitable smooth surface. The dried film is then stripped off, and is ready for use. The films may be made in various thicknesses, usually on the order of from about .005" to .020" thick. It will be understood that the films, and the materials from which they are made, must not be permitted to pass over to the final cured state before they are used to bond the friction materials to their metallic backings.

The processes wherein the adhesive films of this invention are employed fit readily into production schedules and facilities. In general, the adhesive film is sandwiched between the non-metallic friction facings and the metallic backings of the friction elements to be adhered together, and the assemblies clamped in suitable presses or jigs to hold the elements together during the heating step. The assemblies are then heated to a temperature, usually from about 325° to about 400° F., and for a time, usually from about 10 minutes to about 45 minutes, sufficient to fuse the adhesive film into intimate contact with the elements to be adhered together, and to cure the fused film. The assemblies are then cooled, and removed from the compressing means. In the finished assemblies, the friction facings will be firmly and permanently adhered to the metallic backings, the adhesion being highly resistant to shock and other stresses and strains to which it will be subjected in use.

With the foregoing general discussion in mind, there are given herewith detailed specific examples of the practice of this invention. All parts given are by weight.

Example 1

| | Parts |
|---|---|
| Butadiene - acrylonitrile elastomer ("Hycar OR-15," a copolymer of 55% butadiene and 45% acrylonitrile manufactured by The B. F. Goodrich Co.) | 100 |
| Zinc oxide | 5 |
| Mercaptobenzothiazole | 1 |
| Antioxidant ("Neozone D," a product of E. I. du Pont de Nemours Company, a phenyl-$\beta$-naphthylamine) | 5 |
| Sulfur | 5 |
| Phenolic resin ("Durez No. 12,987," a product of Durez Plastics and Chemicals, Inc., a fusible phenol-formaldehyde resin blended with about 20% of a fusible acid-catalyzed, hexamethylene tetramine neutralized polymerized cardanol resin) | 150 |

The elastomer was broken down on a cold mill, and the zinc oxide, mercaptobenzothiazole and antioxidant added in the order named. The mill was then heated up to 100° C. roll surface temperature, and the phenolic resin added and smoothly blended in. The mill was then cooled and the sulfur added and worked in. The resultant compound was then sheeted out on a calender heated at 70° C. to a sheet .010" thick.

This sheet was employed to adhere a phenolic resin-asbestos composition passenger car brake lining to its steel brake shoe backing. The brake lining and metallic brake shoe backing were laid up, with the film produced as above described interposed. The assembly was then placed in a holding jig arranged to hold the lining and backing firmly together during the curing step. The assembly was then heated at 375° F. for 20 minutes, cooled, and removed from the jig. The resultant brake shoe gave satisfactory service until the friction composition was substantially worn away.

Example II

| | Parts |
|---|---|
| Butadiene - acrylonitrile elastomer (Hycar OR-15) | 100 |
| Benzothiazyl disulfide | 1 |
| Phenolic resin ("Durez 7031," a product of Durez Plastics & Chemicals, Inc.,) a fusible acid-catalyzed, hexamethylene tetramine neutralized phenol-formaldehyde resin) | 135 |
| Sulfur | 2 |

The elastomer was broken down on a cold roll mill, and the phenolic resin worked in. The mill was then heated to 120° C. to effect fusion of the mass, and thereafter cooled down again. The benzothiazyl disulfide, and finally the sulfur, were then worked in. The compound was calendered out into a film .015" thick, and used to bond brake linings to metallic brake shoes, and clutch facings to their corresponding metallic backings, similarly as in Example I. Highly satisfactory products were obtained in every case.

From the foregoing general discussion and detailed specific examples, it will be evident that this invention provides novel and highly satisfactory adhesive materials and methods for attaching non-metallic friction elements to their metallic backings. The process may be carried out expeditiously, with the use of very simple equipment, and with minimum expenditure of skilled labor. The adhered assemblies give excellent service under the most adverse conditions.

What is claimed is:

1. A composite friction element comprising a steel backing, and a phenolic resin asbestos composition friction facing adhesively secured thereto by means of a bonding medium comprising, by weight, a cured butadiene-acrylonitrile-type elastomer, 100 parts, and a cured phenolic resin, 75-500 parts, said elastomer being a copolymer of a compound having the formula

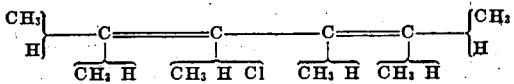

with from 10% to 75%, based on the total weight of copolymerized compounds, of a compound having the formula

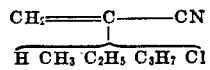

in which formulae each bracket indicates the attachment of a substituent selected from the group of substituents consisting of those shown embraced thereby, and said phenolic resin being the resinous condensation product of an aldehyde with a compound selected from the group consisting of phenol, the cresols, the dihydroxybenzenes and mixtures containing compounds of this group.

2. A composite brake shoe comprising a steel backing and a phenolic resin asbestos composition friction facing adhesively secured thereto by means of a bonding medium comprising, by weight, a cured butadiene-acrylonitrile-type elastomer, 100 parts, and a cured phenolic resin, 75-500 parts, said elastomer being a copolymer of a compound having the formula

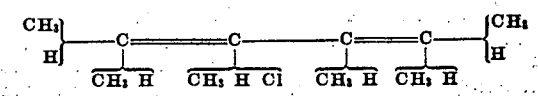

with from 10% to 75%, based on the total weight of copolymerized compounds, of a compound having the formula

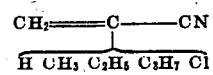

in which formulae each bracket indicates the attachment of a substituent selected from the group of substituents consisting of those shown embraced thereby, and said phenolic resin being the resinous condensation product of an aldehyde with a compound selected from the group consisting of phenol, the cresols, the dihydroxybenzenes and mixtures containing compounds of this group.

3. A composite brake shoe comprising a steel backing and a phenolic resin asbestos composition friction facing adhesively secured thereto by means of a bonding medium comprising, by weight, a cured butadiene-acrylonitrile elastomer, 100 parts, and a cured phenol-formaldehyde resin, 75-500 parts, said elastomer being a copolymer of butadiene with from 10% to 75%, based on the total weight of copolymerized compounds, of acrylonitrile.

4. The method which comprises superposing a phenolic resin asbestos composition friction facing upon a steel backing with a self-supporting adhesive film having a thickness of from .005 inch to .020 inch interposed therebetween, said film comprising, by weight, an uncured butadiene-acrylonitrile-type elastomer, 100 parts, and an uncured thermosetting phenolic resin, 75-500 parts, said elastomer being a copolymer of a compound having the formula

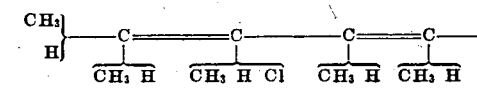

with from 10% to 75%, based on the total weight of copolymerized compounds, of a compound having the formula

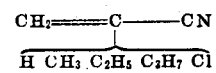

in which formulae each bracket indicates the attachment of a substituent selected from the group of substituents consisting of those shown embraced thereby, and said phenolic resin being the resinous condensation product of an aldehyde with a compound selected from the group consisting of phenol, the cresols, the dihydroxybenzenes and mixtures containing compounds of this group, and subjecting the assembly to heat and pressure to cause the film to fuse and flow into intimate contact with the facing and backing, and to convert the film to a final cured state.

5. The method which comprises superposing a phenolic resin asbestos composition friction facing upon a steel backing with a self-supporting adhesive film having a thickness of from .005 inch to .020 inch interposed therebetween, said film comprising, by weight, an uncured butadiene-acrylonitrile elastomer, 100 parts, and an uncured thermosetting phenol-formaldehyde resin, 75–500 parts, said elastomer being a copolymer of butadiene with from 10% to 75%, based on the total weight of copolymerized compounds, of acrylonitrile, and subjecting the assembly to heat and pressure to cause the film to fuse and flow into intimate contact with the facing and backing, and to convert the film to a final cured state.

6. The method which comprises superposing a phenolic resin asbestos composition friction facing upon a steel brake shoe with a self-supporting adhesive film having a thickness of from .005 inch to .020 inch interposed therebetween, said film comprising, by weight, an uncured butadiene-acrylonitrile elastomer, 100 parts, and an uncured thermosetting phenol - formaldehyde resin, 75–500 parts, said elastomer being a copolymer of butadiene with from 10% to 75%, based on the total weight of copolymerized compounds, of acrylonitrile, and subjecting the assembly to heat and pressure to cause the film to fuse and flow into intimate contact with the facing and backing, and to convert the film to a final cured state.

FRANK J. GROTEN.
ROBERT J. REID.

REFERENCES CITED

The following references are of record in the file of this patent:

UNITED STATES PATENTS

| Number | Name | Date |
|---|---|---|
| 1,682,319 | Bluhm | Aug. 28, 1928 |
| 1,931,309 | Thompson | Oct. 17, 1933 |
| 2,333,453 | Tilden | Nov. 2, 1943 |
| 2,358,483 | Tilden | Sept. 19, 1944 |
| 2,376,854 | Saunders | May 22, 1945 |
| 2,386,112 | Harkins | Oct. 2, 1945 |
| 2,394,375 | Gross | Feb. 5, 1946 |
| 2,394,478 | Prentice | Feb. 5, 1946 |
| 2,394,783 | Keller | Feb. 12, 1946 |
| 2,398,890 | Howard | Apr. 23, 1946 |
| 2,401,987 | Taylor | June 11, 1946 |
| 2,405,038 | Jennings | July 30, 1946 |
| 2,479,342 | Gibbons | Aug. 16, 1949 |

OTHER REFERENCES

Ser. No. 357,662, Wildschut (A. P. C.), published Apr. 20, 1943.

Wildschut, Rubber Chemistry and Technology, Jan. 1946, pp. 86–99 (Reprint of article originally published in 1942).

"Cycle-Welding Breaks the Barrier," American Machinist, Jan. 6, 1944; pages 106–117; (page 109 especially cited).

Wildschut, "Recueil des Travail Chimiques des Pays-Bas," vol. 61 (1942), pp. 898–909.